Oct. 2, 1934.  A. B. GARDNER  1,975,098
CONSTRUCTION FOR AIRCRAFT
Filed Jan. 14, 1929   7 Sheets-Sheet 1

Oct. 2, 1934.  A. B. GARDNER  1,975,098
CONSTRUCTION FOR AIRCRAFT
Filed Jan. 14, 1929  7 Sheets-Sheet 2
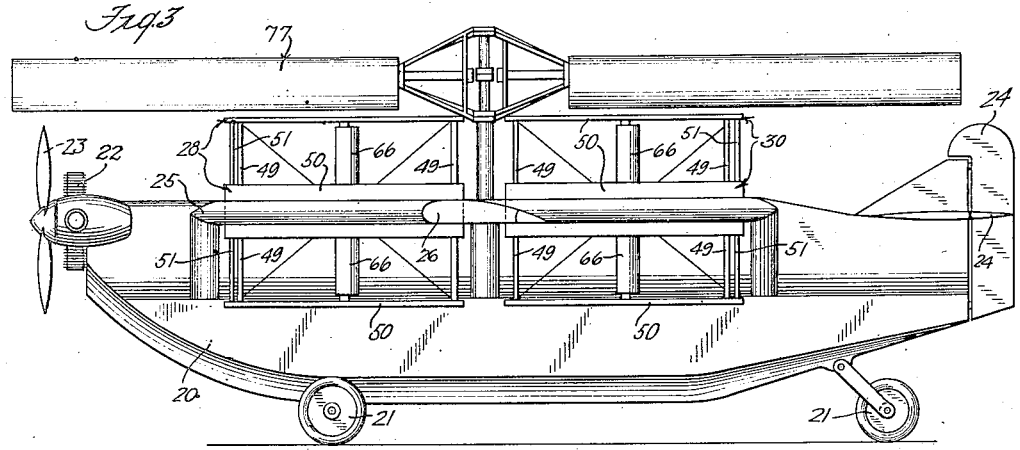
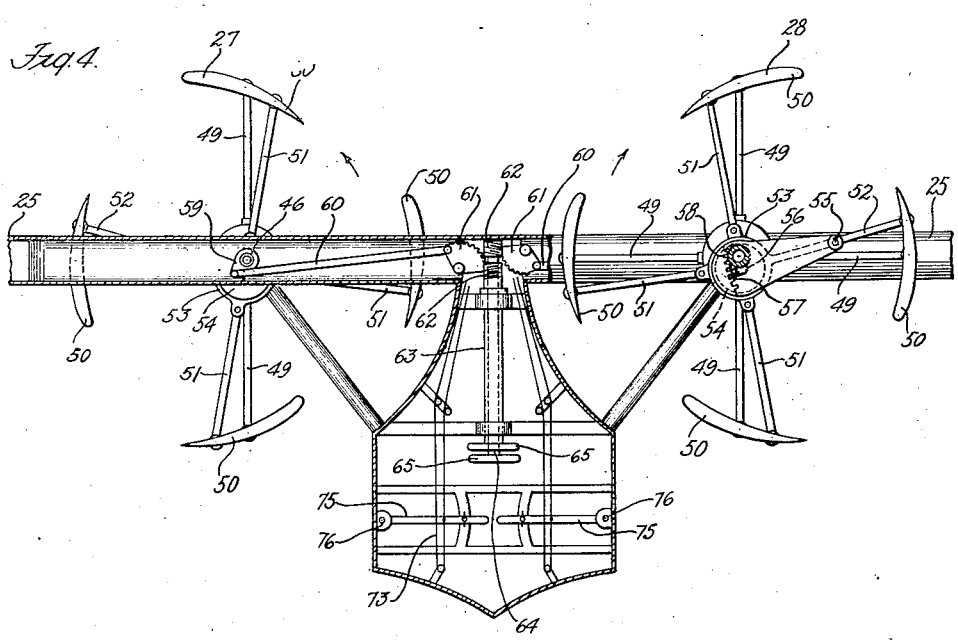
INVENTOR
Albert B. Gardner
BY Robert S. Blair
ATTORNEY Oct. 2, 1934.  A. B. GARDNER  1,975,098
CONSTRUCTION FOR AIRCRAFT
Filed Jan. 14, 1929  7 Sheets-Sheet 3
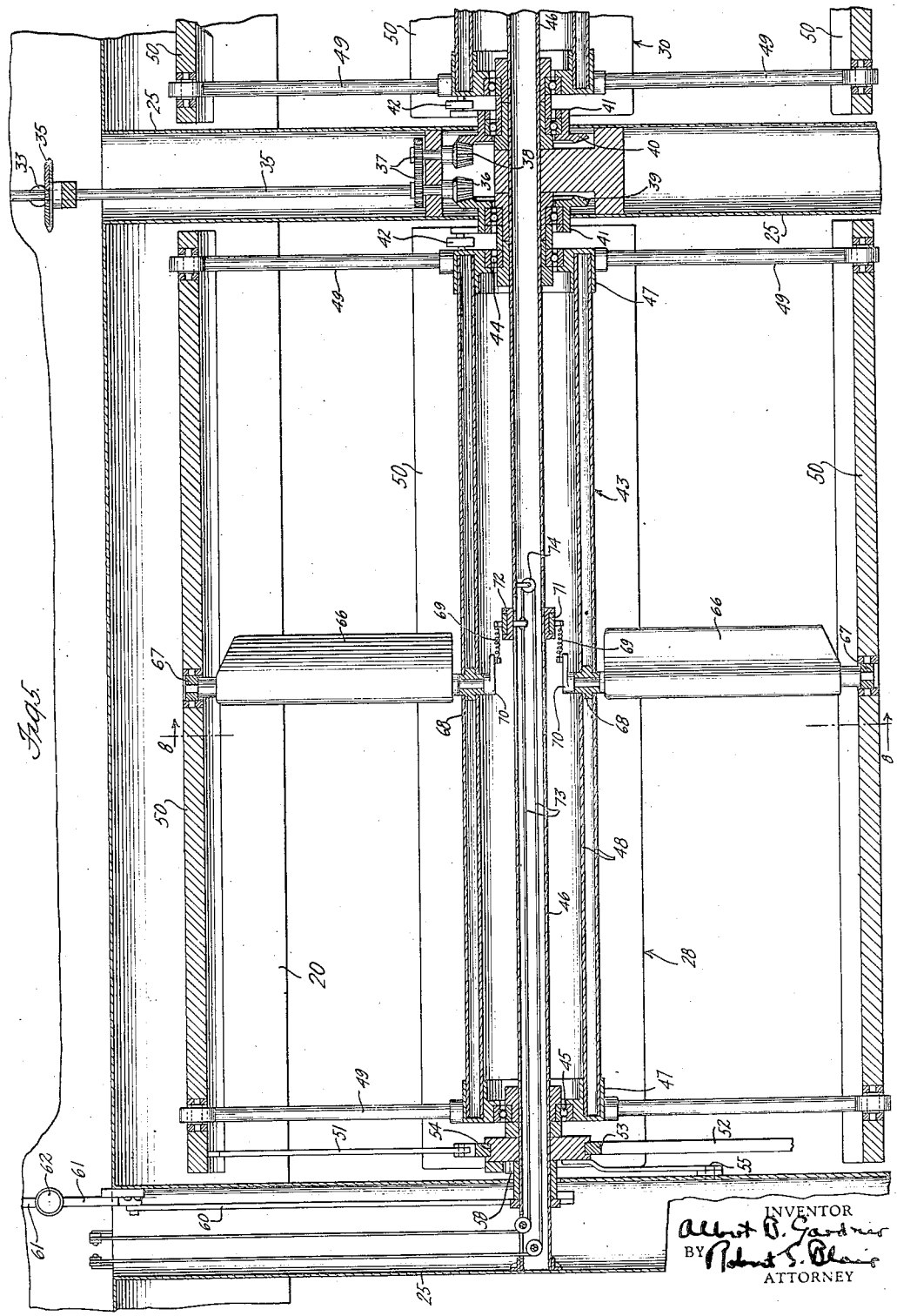

Oct. 2, 1934.   A. B. GARDNER   1,975,098
CONSTRUCTION FOR AIRCRAFT
Filed Jan. 14, 1929   7 Sheets-Sheet 5

INVENTOR
Albert B. Gardner
BY Robert S. Blair
ATTORNEY

Oct. 2, 1934.    A. B. GARDNER    1,975,098
CONSTRUCTION FOR AIRCRAFT
Filed Jan. 14, 1929    7 Sheets-Sheet 6

Oct. 2, 1934.   A. B. GARDNER   1,975,098
CONSTRUCTION FOR AIRCRAFT
Filed Jan. 14, 1929   7 Sheets-Sheet 7

INVENTOR
Albert B. Gardner
BY Robert S. Blair
ATTORNEY

Patented Oct. 2, 1934

1,975,098

UNITED STATES PATENT OFFICE 1,975,098

CONSTRUCTION FOR AIRCRAFT

Albert B. Gardner, Racine, Wis.

Application January 14, 1929, Serial No. 332,269

7 Claims. (Cl. 244—19)

This invention relates to aircraft, and more specifically, to aircraft of the so-called heavier-than-air type.

One of the objects thereof is to provide a practical construction of the above nature which shall be simple and dependable. Another object is to provide a construction of the above nature characterized by efficient action. Other objects are to provide a construction of the above nature which shall be readily adaptable to meet conditions of use, easily controlled, characterized by a high degree of safety in performance, economical of power, and adapted to maintain its original efficiency throughout the hardest use. Other objects will be in part obvious and in part pointed out hereinafter.

The invention accordingly consists in the features of construction, combinations of elements, and arrangement of parts as will be exemplified in the structure to be hereinafter described and the scope of the application of which will be indicated in the following claims.

In the accompanying drawings, in which are shown one or more of various possible embodiments of the several features of this invention, Figure 1 is a plan of the entire apparatus;

Fig. 3 is a side elevation of the same;
Fig. 4 is a front elevation of a pair of lifting devices and associated parts;

Fig. 5 is a plan of two lifting devices partially in section in order to show the parts more clearly;

Fig. 10 is a sectional view taken along the line 10—10 of Fig. 13;
Fig. 11 is a sectional plan taken along the line 11—11 of Fig. 10;

Fig. 12 is a plan view taken along the line 12—12 of Fig. 10;

Similar reference characters refer to similar parts throughout the several views of the drawings.

Figure 1:
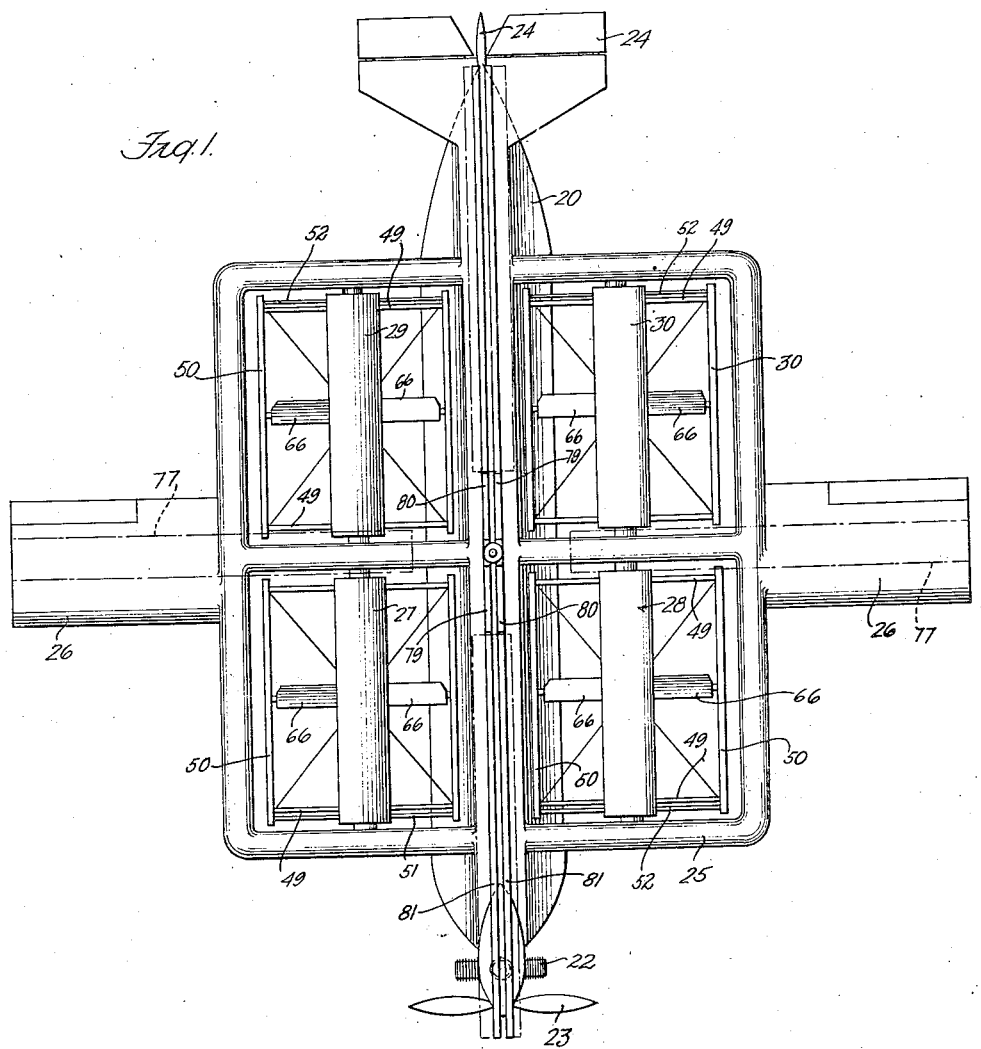
Figure 2:
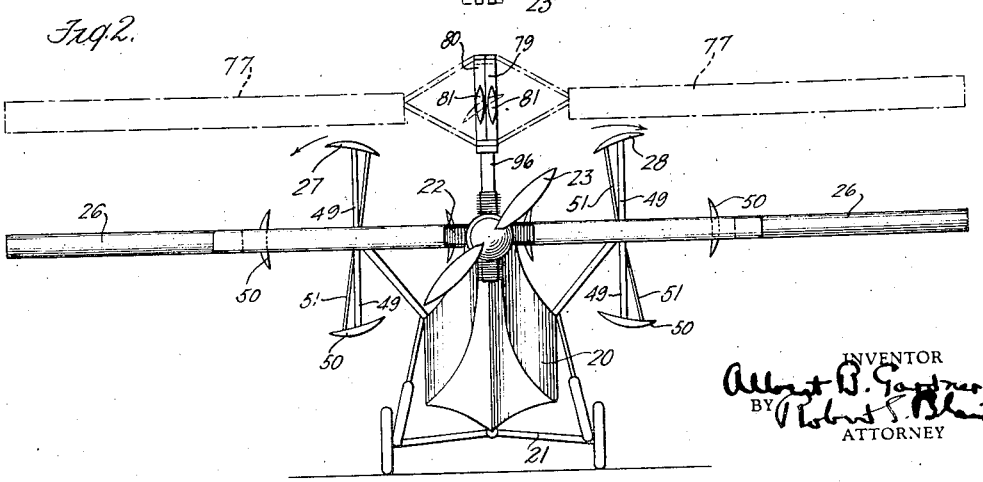
Fig. 2 is a front elevation of the apparatus shown in Fig. 1.

Referring now to Fig. 2 of the drawings in detail, there is shown at 20 a body or fuselage which is mounted upon running gear 21 of any desired type. At the forward end of the fuselage is a motor 22 driving a propeller 23 of the usual form.

At the rear end of the fuselage is the usual apparatus 24 for vertical and horizontal steering of the craft. This is controlled in the usual way.

Mounted upon the fuselage is a frame 25 provided with laterally extending wings 26 at each side adapted to exercise the usual lifting function to some substantial extent when traveling through the air.

Recurring to the frame 25, it will be seen, as shown in plan, that this frame is provided with four lifting devices 27, 28, 29 and 30. Each of these devices is substantially identical in construction, and it is to be noted that many of the advantages of this invention will be gained with a single pair of these lifters, although for best action a greater number of them is now considered preferable.

Figure 6:
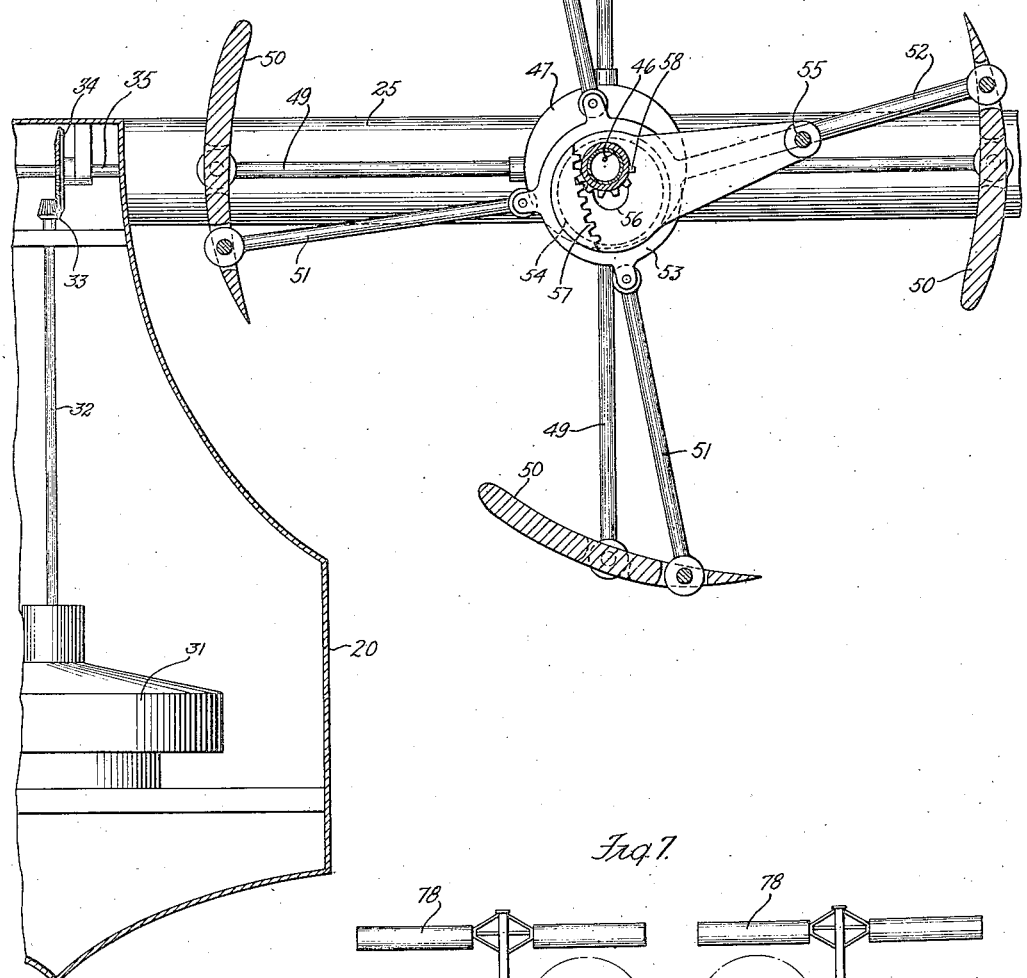
Fig. 6 is a sectional elevation of a lifting device showing driving and adjusting mechanism.

Taking up now the construction of these lifting units, and having reference first to Fig. 6 of the drawings, there is shown at 31 an engine of any desired type driving the shaft 32 which, through bevel gears 33 and 34, drives the cross shaft 35. As best shown in Fig. 5 of the drawings, the shaft 35 drives directly a bevel pinion 36 and, through the spur gears 37, drives likewise a bevel pinion 38. These pinions 36 and 38 respectively drive the bevel gears 39 and 40 which form the primary driving elements of the lifting units 28 and 30 respectively. It is understood that the shaft 35 extending in the opposite direction crosswise of the machine drives by similar means lifting units 27 and 29. The action of the bevel gear 39 and parts driven thereby, being substantially identical with that of the corresponding parts in the other lifting units, will alone be described in detail. This gear, acting through the sleeve-like extension 41 and link connection 42, drives a rotary frame 43 journaled by suitable ball bearings at 44 and 45 upon a central non-rotary tube 46. This frame comprises end fittings or spiders 47 connected by the longitudinal tubes 48 and each provided with four radial arms or spokes 49.

Recurring to Fig. 6 of the drawings, each of the arms 49 has pivotally secured at its outer end a lifting vane 50 which is likewise pivoted to the opposite arm 49 of the lifting device in such manner that the vane may rock about a line substantially central thereof and parallel to the central tube 46. These vanes, as shown in the drawings, are of stream-line form and are pivotally connected at points adjacent their rear edges by means of the links 51 and 52 with a central fitting 53 journaled upon an eccentric 54. The link 52 is rigidly connected at its inner end with the eccentric ring 53, whereas the remaining links 51 are pivotally connected thereto. The eccentric 54 is pivoted at 55 to the frame of the machine, as shown in Fig. 5 of the drawings, and is provided with an arcuate slot 56 through which the tube 46 passes. Formed on this eccentric is a gear segment 57 meshing with and controlled by a mutilated pinion 58. As the latter part is rotated, it is seen that the eccentric is swung about the pivotal connection 55 and its eccentricity varied as desired.

The swinging of these pinions 58, which may be journaled upon the inner tube 46, is brought about as shown in Fig. 4 of the drawings by cranks 59 connected by links 60 with worm wheel segments 61 meshing with worms 62 formed in the case of each pair of lifting devices respectively upon a rotary tube 63 and an inner shaft 64 controlled by hand-wheels 65. It will thus be seen that the pitch or inclination of the lifting vanes may be adjusted as desired, and the lifting effect with a given speed of rotation may be correspondingly varied. It will also be seen that the lifting vanes are substantially stream-line in their action, lifting by the lateral element of their travel and substantially feathering in their up-and-down movement.

It is also to be noted that by a suitable adjustment of the above parts the rate and time of change of incidence to the air may be altered. For example, denoting the positions of these planes in their travel by analogy to the hand of a clock, they may be so arranged that at the nine-o'clock and three-o'clock positions they move substantially edgewise, and from the half past ten- to half past one-, as well as from the half past four- to half past seven-positions, they maintain a substantially constant incidence at the most effective angle. Their change from this angle of incidence to and from their angles of what might be termed zero incidence occurs from the half past seven- to the half past ten-positions and from the half past one- to the half past four-positions. The angle of incidence, of course, has reference to the circle denoting the path of travel of the vanes.

Figure 8:
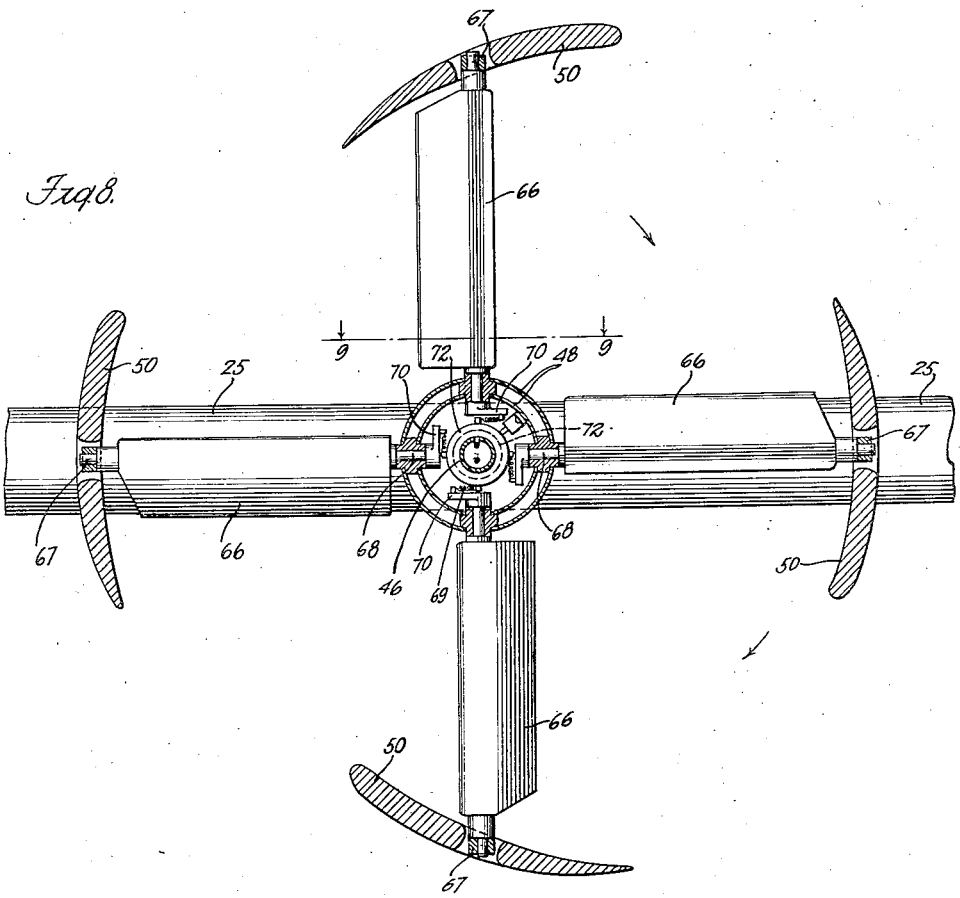
Fig. 8 is a sectional elevation taken substantially along the line 8—8 of Fig. 5.
Figure 9:
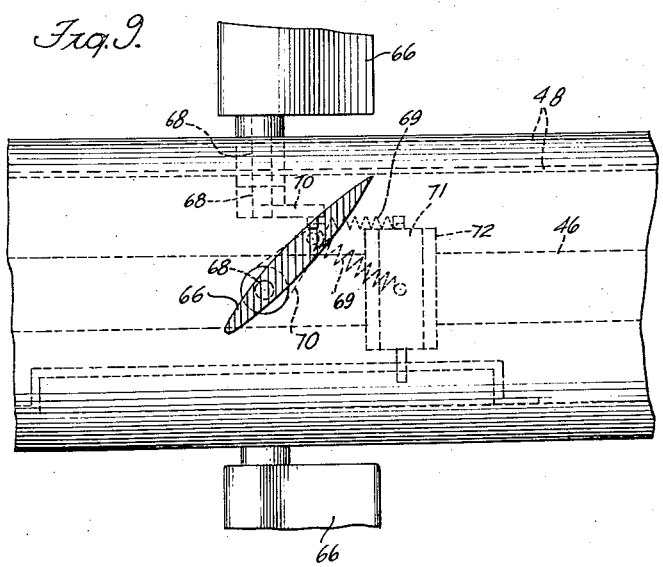
Fig. 9 is a sectional plan taken along the line 9—9 of Fig. 8.

At the center of each lifting device there is preferably provided a propeller comprising propeller vanes 66 each having a universally pivotal connection as shown at 67 in Fig. 8 of the drawings at their outer ends with one of the lifting vanes 50. Aligned with the pivotal connection 67 is a pivotal connection 68 at the inner ends of the vanes 66. The axis of these pivots is near the forward edge of the vane so that it tends to move toward a plane transverse to the axis about which the corresponding lifting device rotates, this tendency being resisted in each case by a spring 69 connected by a crank 70 with the propeller vane. In this manner, as the speed of rotation of the propeller vane increases, its pitch automatically becomes less. The springs 69 are all connected with a ring 71 seated in a flanged collar 72 which is non-rotatable but is slidably mounted upon the inner tube 46. This collar 72, and with it the tension of the springs 69, is adjusted by means of a wire 73 passing over a pulley 74 and having its ends controlled as shown in Fig. 4 of the drawings by a hand lever 75 pivoted at 76. In this manner the action of the propeller vanes 66 is manually controlled so that their automatic variation of pitch may be governed as desired.

It is also to be noted that by moving the hand lever farther, the corresponding collar 72 is moved to such an extent that the pitch of the blades or vanes is reversed, and thus any of these propellers may be at any desired time reversed and reversed to any desired degree of pitch. This action, of course, brings about a corresponding reversal of thrust of the propeller and a corresponding gain in flexibility of control of the entire craft.

Figure 7:
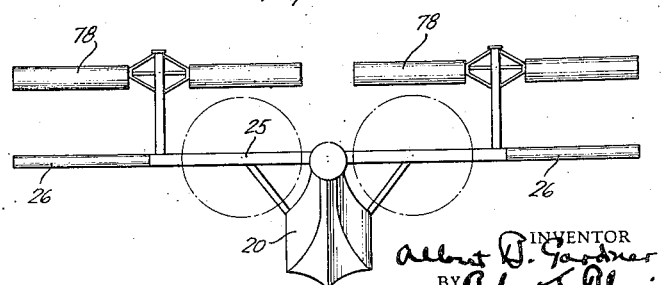
Fig. 7 is a diagrammatic front elevation of apparatus comprising another embodiment of certain features of the invention.

As best shown in Fig. 2 of the drawings, in its relation to the remainder of the craft there is provided an autogyro 77 mounted to rotate about a central vertical axis. It may be noted that, if desired, two laterally spaced autogyros may be employed, as shown at 78 in Fig. 7 of the drawings, each of which is constructed substantially the same as the autogyro 77, as hereinafter described. Preferably, however, a single autogyro is used.

Figure 13:
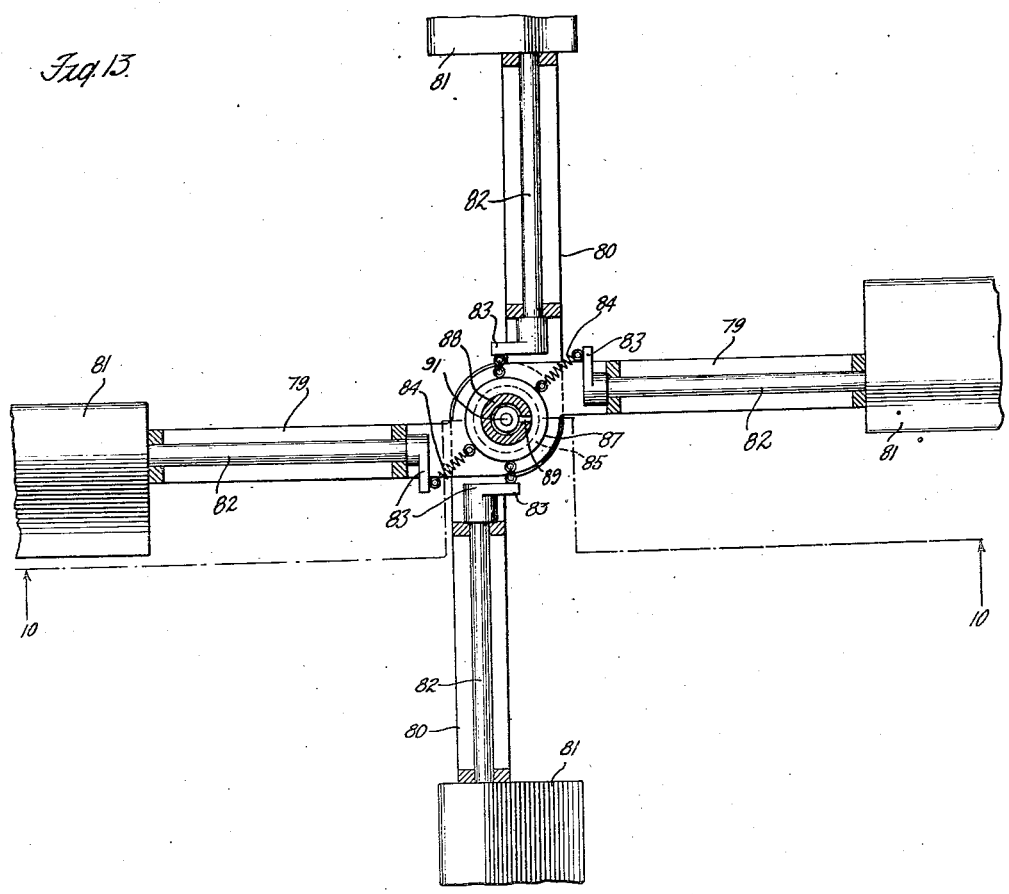
Fig. 13 is a plan view of autogyro apparatus mounted upon the upper portion of the aircraft and shown in open condition.
Figure 14:
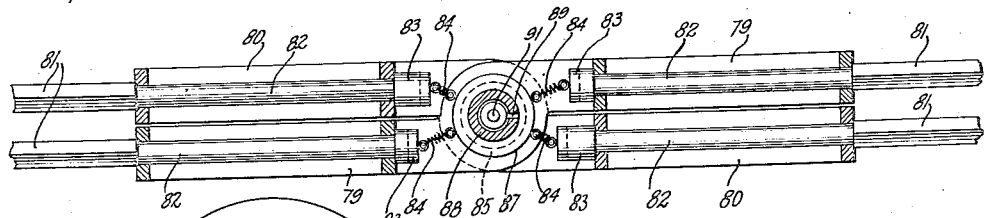
Fig. 14 is a similar view showing the parts in closed condition.
Figure 15:
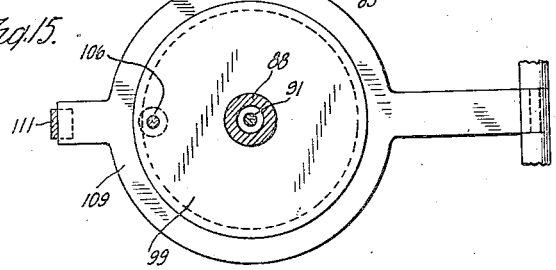
Fig. 15 is a sectional plan taken along the line 15—15 of Fig. 10.

Referring now to Figs. 13 and 14 of the drawings, it will be seen that the autogyro comprises a pair of units 79 and 80, each unit having two radial arms terminating in the usual inclined vane 81. Each of these vanes 81 is directly connected with a shaft 82 mounted to be turned upon its own axis to adjust the pitch of the autogyro and provided at its inner end with a crank 83 connected by a spring 84 with rings 85 and 86 seated in a flanged collar 87 which is fixed upon but slidable with respect to an inner upright tubular shaft 88. This collar 87 is provided with an inwardly extending lug 89 passing through the walls of the shaft 88 and seated between flanges 90 in a vertical rod 91, the position of which may be vertically adjusted by means of a lever 92 pivoted at 93 and provided with a locking segment 94 whereby any desired tension may be placed upon and maintained upon the springs 84.

Recurring to Figs. 13 and 14 of the drawings, it will be seen that the two units 79 and 80 are so related one to the other that they may be folded against one another, as shown in Fig. 14, or extended in such manner as to lie at 90° one to the other, as shown in Fig. 13. When in action, they are extended as shown in Fig. 13, but during the normal travel of the plane they are folded, as shown in Fig. 14, and lie lengthwise of the top of the plane.

This folding action is permitted by the following construction: The unit 79 is connected with the inner tubular shaft 88 and the unit 80 is connected with an outer tubular shaft 95, these shafts being held in position by the sleeve 96 flanged and bolted to the frame of the machine, as shown at 97. Relative upward movement of the autogyro with respect to the frame of the machine is prevented by a collar 98 upon the shaft 95 and a plate 99 upon the inner shaft 88, it being understood that the two elements 79 and 80 are held downwardly at the top above their point of intersection by means of the cap screw 100.

Normally, the autogyro is permitted free movement, but, if it is desired, power may be applied thereto by a connection to the inner shaft 88 and plate 99 from a bevel gear 101 driven through the bevel pinion 102 and a releasable clutch 103 from an auxiliary engine 104, or any other desired source of power, such as the main engine.

Facing the plate 99 and superposed thereon is a plate 105 secured to the outer shaft 95. These plates are normally locked together with the elements 79 and 80 at right angles one to the other by means of a sliding pin 106 urged by a spring 107 into a recess 108 in the lower surface of the plate 105. This pin 106, however, may be depressed by means of a swinging lever 109 so that its end snaps into the notch 110 in the flat spring 111 instead of the notch 112 in which it normally rests. When this action takes place the two units may rotate with respect one to the other and one of them may be brought to a stop by braking the shaft 95 by means of a brake band 113 controlled by a pivoted brake lever 114. By the use of this brake, the desired hole 115 may be brought beneath a movable pin 116, and the latter depressed so as to interlock with the plate and hold it stationary in a position in which the corresponding autogyro element will be longitudinal of the aircraft. This pin 116 is slidably mounted in a fitting 117 and is held either in its upper or lower position by means of a spring-pressed plunger 118. When the plate 105 has been locked into the desired position, the pin 106 is depressed so as to permit the remaining element of the autogyro to swing parallel to that which has been locked, whereupon the pin 106 is snapped upwardly into a notch 119 at right angles with the notch 120 which it formerly occupied. When this is done, the two autogyro members will rest snugly side by side, as shown in Fig. 14 of the drawings, it being understood that their component arms, although parallel, are slightly offset so as to permit this compact folding of the device as a whole.

It will thus be seen that there is provided apparatus which is of a simple and dependable character and which nevertheless is susceptible of complete adjustment in all particulars to meet the varying conditions of use. The primary lifting elements are of essentially efficient character and may be utilized for substantially vertical ascent or descent. In the forward travel of the machine, however, the ordinary vanes aid in a lifting effect and the propeller at the nose of the machine, as well as those of the lifting devices, contributes to a high speed of travel through the air. The automatic adjustment of the vanes governed as herein described tends to regulate the effect of the propellers by giving an increased thrust in proportion to the speed as the speed diminishes. The autogyro, aside from its normal functions in enhancing safety, presents a number of advantageous features in the matter of control and compactness. In short, the apparatus herein described attains the various objects of the invention and is well adapted to meet the conditions of the hardest practical use.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In an aircraft, in combination, a gyrocopter device comprising a pair of vaned members relatively movable about a common axis, means for providing a driving connection between said members and for holding them either in normal angular operating arrangement or folded into parallel relation to one another, releasable means for rotating said members, and means for holding said members in an inoperative position extending longitudinally of said aircraft.

2. In an aircraft, in combination, a gyrocopter device comprising a pair of vaned members relatively movable about a common axis, means for providing a driving connection between said members for holding them either in normal extended position or folded into parallel relation to one another, releasable means for rotating said members, and means for holding said members when parallel to each other in a position extending longitudinally of said aircraft.

3. In an aircraft, in combination, a gyrocopter device comprising a pair of vane members relatively movable about a common axis, means for holding said vane members in a normal extended position, means for releasing said last-mentioned means to permit said vane members to fold into parallel relation side by side while the aircraft is in flight, and means for returning said vane members to their operative position while the aircraft is in flight.

4. In an aircraft, in combination, a gyrocopter device comprising vane members relatively movable about a common axis, means for holding said vane members in angular relation to each other, means for releasing said last-mentioned means to permit said vane members to fold into a substantially parallel relation while the aircraft is in flight, and means capable of causing said vane members to reassume said angular position while the aircraft is in flight.

5. In an aircraft, in combination, a gyrocopter device comprising vane members relatively movable about a common axis, means for holding said vane members in angular relation to each other, means for releasing said last-mentioned means to permit said vane members to fold into a substantially parallel relation while the aircraft is in flight, and means for controlling the inclination of said vane members.

6. In aircraft construction, a gyrocopter apparatus including, in combination, means forming a shaft the axis of which is substantially perpendicular to the fuselage, a frame secured to the upper end of said last-mentioned means, a plurality of rock shafts rotatably mounted in said frame, the axes of said rock shafts being at right angles to the axis of said first-mentioned means, a plurality of vanes secured to said shafts, crank arms secured to each of said shafts, a member mounted in sliding relation to said first-mentioned means, means forming a resilient connection between said crank arms and said member, and means for controlling the position of said member along said first-mentioned means.

7. In aircraft construction, a gyrocopter apparatus including, in combination, a sleeve member secured to the fuselage, a sleeve member rotatably mounted in said first-mentioned sleeve member, a frame secured to said last-mentioned sleeve member and adapted to rotate therewith, a series of rock shafts rotatably mounted in said frame, vanes secured to said rock shafts, the axes of said shafts being substantially perpendicular to the axis of said second-mentioned sleeve member, crank arms secured to each of said rock shafts, a collar slidably mounted on said second-mentioned sleeve member, springs connecting each of said crank arms to said collar, a rod secured to said collar and extending down through said second-mentioned sleeve member, and means for actuating said rod longitudinally with respect to said second-mentioned sleeve member.

ALBERT B. GARDNER.